United States Patent
Morris et al.

(10) Patent No.: US 11,774,945 B2
(45) Date of Patent: Oct. 3, 2023

(54) METHOD AND SYSTEM RELATING TO COOLING CONDITIONS FOR A BIOLOGICAL SAMPLE

(71) Applicant: Asymptote Ltd., Cambridge (GB)

(72) Inventors: George Morris, Cambridgeshire (GB); Peter Kilbride, Cambridgeshire (GB); Stuart Milne, Cambridgeshire (GB)

(73) Assignee: Asymptote LTD., Cambridge (GB)

( * ) Notice: Subject to any disclaimer, the term of this patent is extended or adjusted under 35 U.S.C. 154(b) by 653 days.

(21) Appl. No.: 16/955,143

(22) PCT Filed: Dec. 20, 2018

(86) PCT No.: PCT/EP2018/086132
§ 371 (c)(1),
(2) Date: Jun. 18, 2020

(87) PCT Pub. No.: WO2019/122090
PCT Pub. Date: Jun. 27, 2019

(65) Prior Publication Data
US 2020/0319625 A1    Oct. 8, 2020

(30) Foreign Application Priority Data

Dec. 22, 2017    (GB) .................................. 1721820

(51) Int. Cl.
*G05B 19/4155*    (2006.01)
*A01N 1/02*    (2006.01)
(52) U.S. Cl.
CPC ....... *G05B 19/4155* (2013.01); *A01N 1/0257* (2013.01); *G05B 2219/50333* (2013.01)
(58) Field of Classification Search
CPC .. A01N 1/0257; A01N 1/0284; A01N 1/0242; A01N 1/0252; G05B 19/4155; G05B 2219/50333; G01R 17/02
See application file for complete search history.

(56) References Cited

U.S. PATENT DOCUMENTS 4,712,607 A * 12/1987 Lindemans ............... F25D 3/10
62/51.1
2008/0034082 A1    2/2008 McKinney
(Continued)

FOREIGN PATENT DOCUMENTS

| CN | 101118502 A1 | 4/2015 |
| JP | 201234667 A | 2/2012 |
| WO | 2008/047154 A2 | 4/2008 |

OTHER PUBLICATIONS

PCT International Search Report and Written Opinion for PCT Application No. PCT/EP2018/086132 dated Apr. 11, 2019 (12 pages).
(Continued)

*Primary Examiner* — Lionel Nouketcha
(74) *Attorney, Agent, or Firm* — Eversheds Sutherland (US) LLP (57) ABSTRACT

Disclosed is a computer-implemented method comprising: obtaining first data indicative of electric power supplied to a cooling apparatus during a cooling operation on a biological sample, the cooling operation having a given cooling condition; obtaining second data associated with a reference cooling condition; determining, based on the first data and the second data, whether the given cooling condition has a predetermined relationship with the reference cooling condition; and in response to a determination, by the determining, that the given cooling condition has the predetermined relationship with the reference cooling condition, outputting a control signal. The given cooling condition for the "live" data cooling operation may thus be validated against a reference cooling condition.

19 Claims, 5 Drawing Sheets

(56) References Cited

U.S. PATENT DOCUMENTS

2012/0017633 A1    1/2012  Hong et al.
2017/0108253 A1    4/2017  Monroy
2017/0108523 A1    4/2017  van Grinsven

OTHER PUBLICATIONS

GB Search Report for GB Application No. 1721820.7 dated Jun. 25, 2018 (3 pages).
Miassie et al., "GMP Cryopreservation of Large Volumes of Cells for Regenerative Medicine: Active Control of the Freezing Process," Tissue Engineering, Part C, 2014, 20(9):693-702.
Chinese Office Action for CN Application No. 201880082266.1 dated Jul. 5, 2022 with English Translation (19 pages).
Japanese Office Action for JP Application No. 2020-534552 dated Jun. 13, 2022 with English Translation (12 pages).

* cited by examiner

METHOD AND SYSTEM RELATING TO COOLING CONDITIONS FOR A BIOLOGICAL SAMPLE

CROSS REFERENCE TO RELATED APPLICATIONS

This application claims the priority benefit of PCT/EP2018/086132 filed on Dec. 20, 2018, which claims priority to Great Britain Patent Application No. 1721820.7 filed Dec. 22, 2017, the entire contents of which are hereby incorporated by reference herein.

BACKGROUND

Biological materials—for example (e.g.) cells, vaccines, and proteins—often need to be preserved. For example, biological materials may need to be preserved so that they can be studied or used in scientific experiments at a later point in time. In another example, human oocytes or fertilised embryos may be preserved as part of the in vitro fertilisation (IVF) process. In these examples, it is important that the biological material is preserved in such a way that damage to, or degradation of, the biological material is minimised. Freezing techniques are often used to preserve biological material. There are different ways to freeze biological materials in order to preserve them. For example, cryopreservation is a process in which biological material is frozen and then stored in a frozen state, while freeze drying (lyophilisation) is a process in which a biological sample is frozen and following the freezing step, water is removed from the sample, such that the sample is stored in a dried state.

Cryopreservation is a technique used to maintain long-term viability of biological samples for subsequent application in medicine, biotechnology and veterinary sciences. Cryopreservation involves cooling samples to, and potentially maintaining them for prolonged periods at, low temperatures, typically −196 degrees Celsius (° C.)—the boiling point of liquid nitrogen. By cooling a biological sample to −196° C. the kinetics of chemical and/or enzymatic reactions that would otherwise degrade the sample are slowed to such an extent that the sample no longer degrades. Thus, biological samples can be stored over prolonged periods and then brought back to ambient temperature as required.

Cryopreservation is particularly useful in cell and gene therapies, especially immunotherapies. A cold chain, for example a temperature-controlled supply chain comprising a series of stages relating to production, distribution and storage of cryopreserved biological samples, may be used in an effective clinical delivery of these therapies.

During such a cold chain, an initial biological sample, for example containing biological cells, for example (e.g.) 200 millilitres (ml) to 600 ml in volume, may be frozen to allow shipment to a so-called manufacturing centre. For clinical delivery, a final cell therapy product, e.g. having a volume in the range of 10 ml to 500 ml, may be cryopreserved to allow quality control of the cell therapy product to take place, to enable patient scheduling, and facilitate transport of the biomass to the bedside.

Cryopreservation of relatively large volumes may also be relevant to other biological samples, such as blood plasma, cell suspensions, bone marrow (adult stem cells) and organoid systems. Such relatively large volumes of cell suspensions are routinely cryopreserved in cryopreservation bags, or "cryobags" (e.g. 5 ml to 1000 ml fill capacity). To protect cryobags against mechanical damage during long term storage they may be sealed within another bag (an "over wrap") and/or placed into a metal cassette.

Other specialist cryocontainers may be used to retain samples for cryopreservation, such as: straws, which are thin walled tubes and typically 2 mm to 4 mm in diameter with a length of up to 140 mm, and a capacity of 0.2 ml to 0.5 ml; cryovials, which typically have a wider diameter (e.g. 12.5 mm) and are shorter tubes than typical straws, with a capacity of 0.5 ml to 5.0 ml; and multi-well plates, matrix tubes and other SBS (Society for Biomolecular Sciences) formats employed in robotics, high throughput screening, etc.

To reduce cellular damage during freezing and thawing, a protective compound (so-called "cryoprotective additive") may be added to the sample. A commonly employed additive is dimethyl sulfoxide (DMSO), which is typically used at a concentration of 5% w/v to 15% w/v, where % w/v denotes a mass concentration. A number of other cryoprotective additives are known, such as glycols including ethylene glycol, propylene glycol, and glycerol.

DETAILED DESCRIPTION

The methods and apparatuses presented herein implement monitoring of a cooling operation performed on a sample based on data indicative of electric power supplied to a cooling apparatus during the cooling operation. Such data, which may be considered "live" data measured during the monitoring of the live cooling operation in examples, may be compared to reference data in order to determine whether a cooling condition of the cooling operation is substantially the same as, or different to, a cooling condition of the reference data. The cooling condition may comprise data for parameters such as the sample volume; sample composition; number of samples; sample container size; sample container type; cooling apparatus type; cooling rate; cooling profile; and/or initial temperature of the sample or heat sink of the cooling apparatus. In this way, the cooling condition (referred elsewhere herein as the given cooling condition), or parameters thereof, for the live cooling operation may be validated against a reference cooling condition (or parameters thereof), for example to inform a user that the correct sample volume, sample composition, number of samples, for example, is as expected with regards to the reference cooling condition. In examples, if it is determined that the cooling condition value(s) of the live cooling operation are substantially dissimilar to those of the cooling condition associated with the reference data, an alert may be generated and transmitted (and/or stored as part of a generated report or logged data) and/or the cooling operation may be stopped, due to the determination that the sample being cooled in the live cooling operation is not as expected with respect to the reference cooling condition.

Such methods and apparatuses may therefore be used in verifying parameters of the biological sample, the cooling apparatus, and/or the cooling operation (which may be comprised as part of the given cooling condition) against the same parameters of a reference sample (which parameters may have been measured or input for a hypothetical reference sample). This can be particularly useful for a biological sample of high monetary value, for example containing patient-specific cells for treatment of the patient, and for which delicate handling needs to be ensured.

Specific details will be described in the following description, in accordance with certain examples of the methods and apparatuses, to explain and expand on specific features thereof.

A range of equipment exists to cool, or freeze, samples. A sample may include a fluid or liquid, e.g. an aqueous solution, to be cooled or frozen. A sample that contains biological material (or "biological matter", "biological media") may be considered a biological sample. A sample may be contained within a container, e.g. a cryocontainer, as described in more detail below. The container may be a vessel, a test tube, a vial, a straw, a multi-well plate, a well, or a bag in examples.

Such cooling equipment includes devices that employ liquid nitrogen as a cryogen, and devices that are cooled by mechanical refrigeration. Passive cooling devices also exist. Following freezing, samples may be held frozen (or "cryopreserved") at a low temperature, for example a cryogenic temperature below $-50°$ C., or below $-180°$ C., e.g. in the range of the boiling point of liquid nitrogen ($-196°$ C.). At around $-196°$ C., cell viability of a biological sample may be considered to be independent of the period of storage of the sample if the cells survived the cooling stage. When the cells are required for use, the biological sample may be thawed, for example in a water bath maintained at $37°$ C. Thawing may be more rapid than the cooling stage. The cryoprotectant may be removed from the sample prior to using the cryopreserved cells, e.g. for therapy.

Biological samples, e.g. comprising cells, are at risk of being damaged, or "injured", during cooling. For example, as ice nucleation occurs and ice crystals form during cooling, the biological material may suffer direct damage from the ice crystals and also damage caused by an increase in concentration of solutes in the sample, as progressively more ice is formed.

Cooling a biological sample in a controlled manner may reduce the damage to the biological material caused by such effects and may thereby help to retain cell viability and function after thawing the sample for use. For example, the biological sample may be cooled at a controlled rate which may be constant or may vary with time, according to a cooling protocol, during a cooling operation.

The cooling protocol may be implemented by a cooling apparatus, e.g. comprised as part of a cooling system such as the VIA Freeze™ equipment manufactured by Asymptote Limited. Some cooling systems blow cold gas over the sample which can cause an uneven cooling rate, or cooling profile (e.g. representing the change in cooling rate over time or temperature) across the sample or between samples where a plurality of samples are to be cooled by the cooling system. The VIA Freeze™ cooling system cools a sample by conduction on the underside of the sample and therefore every sample may experience the same cooling profile.

An example cooling (or "freezing") protocol programmable within the VIA Freeze™ cooling system may include a hold period a few degrees below the theoretical freezing point of the sample to absorb energy released from the latent heat of fusion. For example, if the theoretical freezing point is $-3°$ C., a hold period at $-10°$ C. for 8 minutes may be included in the cooling protocol.

The cooling rate beyond the freezing transition can depend on the nature of the sample being frozen. This may be, for example, $0.3°$ C./min (degrees Celsius per minute) for a particular kind of cell, and $2°$ C./min for another kind. The sample quality, e.g. cell viability or function, on thawing may be severely reduced if the cooling rate after freezing is excessively fast or slow. Once frozen to, for example $-80°$ C. or $-100°$ C., the sample may be removed from the VIA Freeze™ system and placed in long term frozen storage.

In known systems, a controlled rate cooling operation on a sample may be monitored by measurement of the temperature within the sample or within the cooling apparatus and/or cooling system. Such temperature measurements may be carried out using one or more thermocouples, and/or one or more resistance thermometers, e.g. comprising platinum.

Figure 1:
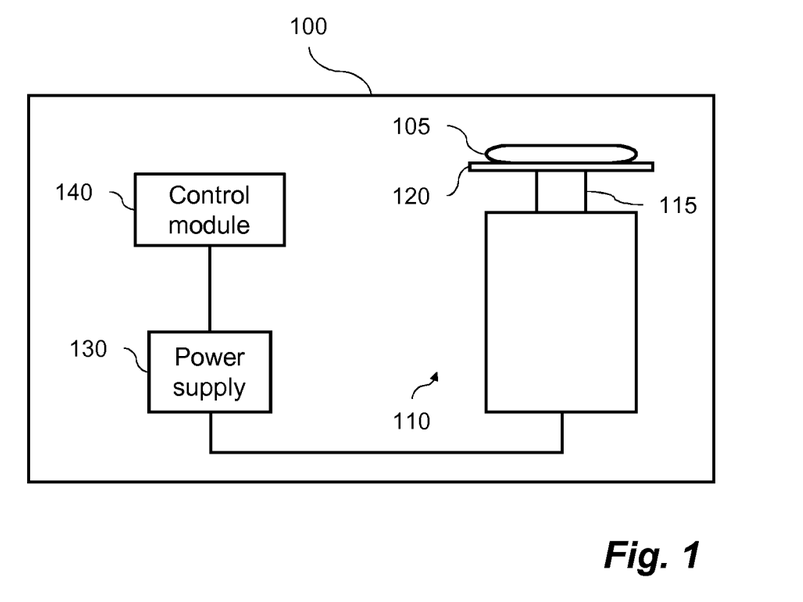
FIG. 1 shows schematically an example cooling system.

FIG. 1 shows an example cooling system 100 comprising a cooling apparatus 110 for cooling a sample 105. The cooling system 100 may comprise a refrigerator or freezer device, for example a controlled rate freezer. In certain examples, the cooling apparatus 110 comprises a cryocooler usable to cool the sample 105, e.g. a biological sample, to a cryogenic temperature. A cryogenic temperature may be considered to be a temperature below $-50°$ C., or below $-180°$ C., as described above. e.g. around the boiling point of liquid nitrogen ($-196°$ C.). The sample 105 is contained in a container, in this example a cryobag, which is arranged to be in contact with a heat conductive plate 120 of the cooling apparatus 110 in the example cooling system 100 shown in FIG. 1. The heat conductive plate 120 is cooled by a "cold finger" 115 of the cooling apparatus 110, which is a localised part of the cooling apparatus 110 that is to be cooled during operation of the cooling apparatus 110. In this way, the sample 105 may be cooled by conductive heat transfer from the sample 105 to the plate 120, and from the plate 120 to the cold finger 115, during operation of the cooling apparatus 110. In such examples, the cold finger 115 and/or conductive plate 120 may be considered to be a "heat sink" of the cooling apparatus 110, in other words an area or part of the cooling apparatus 110 that is to absorb or withdraw heat energy, e.g. from the sample 105, during the cooling operation on the sample 105.

In other examples, the container containing the sample 105 may be positioned within a cooling chamber of the cooling apparatus 110, for example an enclosed volume into which a cryogenic fluid is introduced to surround and cool the sample 105 by convective cooling. Examples of cryogenic fluids include helium, hydrogen, neon, nitrogen, air, fluorine, argon, oxygen and methane. In such examples, the cooling chamber may be considered to be the heat sink of the cooling apparatus 110.

Examples of cryocoolers that may be used as the cooling apparatus 110 include the Stirling cryocooler, the "acoustic Stirling" cryocooler, the Kleemenco cycle cryocooler, the pulse tube cryocooler, and the Joule-Thompson cryocooler.

The cooling apparatus 110 may perform a cooling operation on the biological sample 105, and the cooling operation may be associated with a cooling profile. The cooling profile may be a dataset that comprises objective, or target, temperatures at time intervals of the cooling process. For example, the cooling profile may describe how a temperature, e.g. of the sample 105, should change with time during the cooling operation. An objective cooling rate, e.g. change of temperature with time, may be set at different stages of the cooling profile. In some examples, a constant objective cooling rate may be set in the cooling profile.

The cooling profile, or "temperature profile", may be pre-programmed into a control module 140 of the cooling system 100. The control module 140 may comprise control circuitry, e.g. including one or more processors and computer-readable storage, and be configured to control operation of the cooling apparatus 110. For example, the control module 140 may be linked to a power supply 130 of the cooling apparatus 110, as shown in FIG. 1, and thus may be able to adjust an amount of electric power supplied to the cooling apparatus 110 at a given time.

The power supply 130 of the cooling apparatus 110 may convert electric current from a source (e.g. from an electric power grid via an electrical outlet, or from one or more energy storage devices such as a battery, fuel cell, generator or alternator) to supply electricity with appropriate characteristics (e.g. current, voltage, and/or frequency) to the cooling apparatus 110 in order to power the cooling apparatus 110. The power supply 130 may be a standalone device separate to the cooling system 100 in some examples, while in other examples the power supply 130 may be a part of, e.g. built into, the cooling system 100, as shown in FIG. 1.

The control module 140 may adjust the amount of electric power supplied to the cooling apparatus 110 from the power supply 130 based on a particular cooling profile, which may be programmed into, or obtained by the control module 140. For example, the control module 140 may receive temperature data from one or more temperature sensors, or "probes", representing a measured temperature of the sample 105, and/or cooling chamber in some examples, at a given time during the cooling operation. The control module 140 may compare the received temperature data to an objective temperature value according to the particular cooling profile at a corresponding time, and may adjust the power supplied to the cooling apparatus 110 based on the outcome of the comparison. For example, if the measured temperature at a given time were higher than a target temperature at a corresponding time according to the temperature profile, the control module 140 may increase the amount of power supplied to the cooling apparatus 110 to decrease the temperature of the entity being measured, such as the sample and/or chamber in the examples described. Such comparisons and possible resulting adjustments may occur at predetermined times during the cooling operation, and/or may occur at a regular time interval. In this way, the control module 140 may track the cooling profile during the cooling operation, adjusting the amount of electric power supplied to the cooling apparatus 110 to follow the set cooling profile.

However, temperature measurements taken within the sample 105 may not provide any information relating to the volume of the sample 105 frozen. For quality control of samples to be used clinically, e.g. a sample which may be thawed and infused directly into a patient, it can be useful to validate the volume frozen.

Similarly, temperature measurements taken on a surface of or within the sample container may also not provide accurate information on the composition of the sample 105. A thermocouple arranged near to an ice nucleation site within an undercooled sample may be able to provide sample composition information in a manner similar to a freezing point osmometer. However, at a larger distance from the ice nucleation site temperature measurements may not provide accurate sample composition information. For quality control of cryopreserved samples it can be useful to validate that the correct concentration of cryoprotectant has been added to the sample 105 before freezing. If the incorrect amount of cryoprotectant has been added, e.g. such that a concentration thereof in the sample 105 is too high or too low, then the cell viability and function on thawing may be compromised. The efficacy of the clinical treatment may thus be compromised, too.

Furthermore, for samples which are to be subsequently used clinically, it may not be possible to place a temperature measuring probe into the sample 105, e.g. due to resulting contamination, and/or the physical dimensions of the probe and sample 105 involved.

As described above, the methods and apparatuses presented herein allow for verification of certain parameters of the biological sample, the cooling apparatus, and/or the cooling operation (which may be comprised as part of a given cooling condition) against the same parameters of a reference sample (which parameters may have been measured or input for a hypothetical reference sample, for example).

The methods and apparatuses implement monitoring of a cooling operation performed on a sample based on data indicative of electric power supplied to a cooling apparatus during the cooling operation. The data may comprise one or more electric power values or one or more values of parameters from which electric power values may be derived, e.g. voltage and/or electric current values, for example. Such data, which may be measured during the cooling operation, may be compared to reference data in order to determine whether a cooling condition of the cooling operation is substantially the same as, or different to, a reference cooling condition associated with the reference data. The cooling condition, or parameters thereof, for the cooling operation may be validated against a reference cooling condition (or parameters thereof), for example to inform a user that the sample volume, sample composition, number of samples etc. is as expected with regards to the reference cooling condition. In an example, if it is determined that the cooling condition value(s) of the cooling operation are substantially dissimilar to those of the cooling condition associated with the reference data, an alert may be generated (e.g. transmitted and/or stored as part of a generated report or logged data) and/or the cooling operation may be stopped, due to the determination that the sample being cooled in the cooling operation is not as expected with respect to the reference cooling condition.

The reference data may comprise a so-called "signature power curve" or "fingerprint power curve" associated with the reference cooling condition, with electric power values recorded during a cooling operation on a "reference sample". The cooling operation may have been carried out, with electric power values, and any associated parameter values measured during the cooling operation. Alternatively, the cooling operation may be simulated, and/or the reference data may be input without the cooling operation having been carried out. For example, the cooling operation, and indeed the reference sample, may be hypothetical. When a cooling operation is performed on a biological sample, data indicative of electric power supplied to the cooling apparatus during the cooling operation is obtained, for example in accordance with any of the present methods described herein, and may be compared against the reference data, e.g. a signature power curve, associated with one or more reference cooling conditions. It may thus be determined, as part of the method, whether the given cooling condition (of the cooling operation on the biological sample) has a predetermined relationship with a particular reference cooling condition, based on the data indicative of electric power supplied to the cooling apparatus and the signature power curve of the reference cooling condition. The given cooling condition and the particular reference cooling condition having, or not having, the predetermined relationship may be interpreted as the biological sample and the reference sample, associated with the reference cooling condition, respectively having, or not having, the predetermined relationship. For example, if the predetermined relationship between the entities 'A' and 'B' was that A and B are substantially the same, a determination that the given cooling condition and the particular reference cooling condition are substantially the same may be interpreted as the biological sample and the reference sample being substantially the same. In examples described herein, whether entities A and B, e.g. a given cooling condition and a reference cooling condition, are determined to have a predetermined relationship, e.g. determined to be substantially the same, may depend on a predetermined threshold value, which may be set manually. For example, a metric determined based on A and B, such as a difference thereof, may be compared to the predetermined threshold value. A determination that the metric is: less than; less than or equal to; equal to; greater than; or greater than or equal to; the predetermined threshold value may be indicate that A and B have a predetermined relationship, e.g. are substantially the same. The complementary determination, for example that the metric is: greater than or equal to; greater than; not equal to; less than or equal to; or less than; respectively, may indicate that A and B do not have the predetermined relationship, e.g. are not substantially the same. In some examples, complementary determinations may respectively indicate two different predetermined relationships. For example, complementary determinations may indicate that A and B are either substantially the same or substantially different.

Examples of methods and features thereof will now be described in detail, with some particular examples being described with reference to FIGS. 2 to 4.

Figure 2:
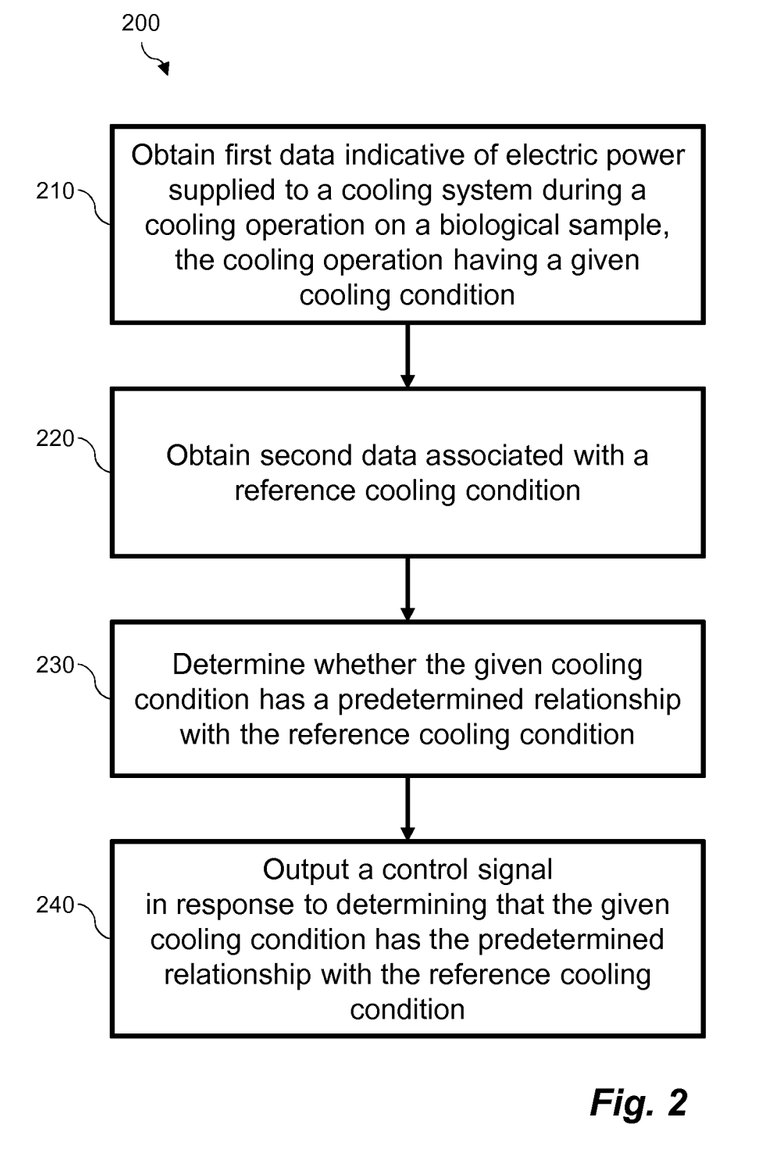
FIG. 2 is a flow diagram relating to examples of a method.

FIG. 2 shows a flow diagram illustrating a method 200 involving, at block 210, obtaining first data indicative of electric power supplied to a cooling apparatus during a cooling operation on a biological sample, the cooling operation having a given cooling condition. As described above, the first data indicative of electric power may comprise one or more electric power values, or may for example comprise one or more values of an electrical parameter from which electric power may be derived, for example voltage and/or electric current. The first data may comprise other parameter values as well as those indicative of electric power, as explained in examples below.

The given cooling condition may comprise values for one or more parameters such as the sample volume; sample composition; number of samples; sample container size; sample container type; cooling apparatus type; cooling rate; cooling profile; and/or initial temperature of the sample or heat sink of the cooling apparatus. The heat sink may be a cold finger of the cooling apparatus in certain examples. At least part of such data for the given cooling condition may be unknown or unverified at the time of the cooling operation. For example, the sample volume and/or sample composition may be assumed or estimated, but unverified.

The method 200 involves, at block 220, obtaining second data associated with a reference cooling condition. The second data may be pre-stored data, e.g. electronic data stored in computer-readable storage. The reference cooling condition may comprise values for one or more parameters such as the sample volume; sample composition; number of samples; sample container size; sample container type; cooling apparatus type; cooling rate; cooling profile; and/or initial temperature of the sample or heat sink of the cooling apparatus. The given cooling condition and reference cooling condition may comprise values for one or more common parameters.

The method 200 also involves at block 230, determining, based on the first data and the second data, whether the given cooling condition has a predetermined relationship with the reference cooling condition. For example, the predetermined relationship between the given and reference cooling conditions may be that they are substantially the same, e.g. within a first tolerance, or substantially different, e.g. outside a second tolerance. In examples, there may be a plurality of tolerances which define a plurality of predetermined relationships.

As an example, the given cooling condition may comprise an unknown value of a first cooling condition parameter, such as sample volume. The reference cooling condition may comprise a known value of the first cooling condition parameter, e.g. 5 ml. Based on: the first data associated with, e.g. measured during, the cooling operation having the given cooling condition; and the second data associated with the reference cooling condition; block 230 may involve determining whether the unknown sample volume value is substantially the same as the known value, in this case 5 ml, for example within a set tolerance.

At block 240, the method 200 involves outputting a control signal in response to determining that the given cooling condition has the predetermined relationship with the reference cooling condition. Thus, the control signal may be generated and output in response to a determination, by the determining, that the given cooling condition has the predetermined relationship with the reference cooling condition. For example, in the case above where the predetermined relationship comprises the given and reference cooling conditions being substantially the same, if it were determined that the unknown sample volume value is substantially the same as the known sample volume value, e.g. within the set tolerance, block 240 would involve outputting the control signal. If it were determined that the given and reference cooling conditions were not substantially the same based on the first and second data, the control signal may not be output at block 240.

In other examples, the predetermined relationship may comprise the given cooling condition and the reference cooling condition being substantially different. In this case, if it were determined at block 230 that the given cooling condition and the reference cooling condition were substantially different, the control signal would be output at block 240. Otherwise, the control signal may not be output.

In examples, the control signal output at block 240 is to cause interruption of the cooling operation. For example, the control signal may be sent to a control module of the cooling apparatus, or of the cooling system as a whole, to stop the cooling operation. This may allow further electric power to not be used in continuing the cooling operation, for example if it were determined at block 230 that the given cooling condition and the reference cooling condition were determined to be substantially different, for example the sample volume and/or composition parameter of the given cooling condition were determined to be substantially different to that of the reference cooling condition.

In other examples, the control signal output at block 240 is to cause an output, indicative of the predetermined relationship between the given cooling condition and the reference cooling condition, via a user interface. For example, if the predetermined relationship comprises the given cooling condition and the reference cooling condition being substantially the same, and this is determined to be the case at block 230, then an output indicative of the given cooling condition and the reference cooling condition being substantially the same may be output by the user interface. The user interface may be a display device, for example a light-emitting diode (LED), or an electronic visual display. The output indicative of the predetermined relationship may comprise words displayed on the electronic visual display, or a particular colour, e.g. a green or red light. In these examples, if the predetermined relationship involved at block 230 were that the given cooling condition and the reference cooling condition are substantially different, the output indicative of the predetermined relationship by the user interface may alert a user to manually interrupt the cooling operation.

In some cases the control signal output at block 240 may cause storage of data representing the determination at block 230 that the given cooling condition has the predetermined relationship with the reference cooling condition. For example, a report or data log may be generated representing parameter values during the cooling operation. Data representing the determination that the given cooling condition has the predetermined relationship with the reference cooling condition may be stored as part of the report or data log, in examples.

In examples, the first data obtained at block 210 comprises a first electric power value, e.g. $P_1$, and the second data obtained at block 220 comprises a second electric power value, e.g. $P_2$. Determining, at block 230, whether the given cooling condition has a predetermined relationship with the reference cooling condition may comprise determining a differential between the first and second electric power values, e.g. $(P_1-P_2)$ or $|P_2-P_1|$. The first electric power value may correspond to a peak value of electric power supplied to the cooling apparatus during the cooling operation. For example, this may be implemented in cases where the cooling apparatus does not need to reach a maximum power usage during the cooling operation, for example where the electric power supplied to the cooling apparatus does not need to reach 100 percent (%) of the maximum power supply in order to follow a cooling profile for the cooling operation. In such cases, the first and second data may comprise respective peak values of electric power supplied to the cooling apparatus during the respective cooling operations. These peak values may therefore be compared to determine whether the given cooling condition and the reference cooling condition are substantially the same, or substantially different, for example.

In examples, the first data obtained at block 210 comprises a first electric power value, e.g. $P_1$, and a first value of an associated parameter, e.g. $x_1$. For example, the first data may comprise a tuple of the first electric power and associated parameter values $(P_1, x_1)$.

The associated parameter may correspond to time, or the temperature of a heat sink of the cooling apparatus. The first data may therefore comprise a first electric power value, $P_1$, with a corresponding time value or heat sink temperature value during the cooling operation, $x_1$. A heat sink temperature value may be measured by one or more temperature sensors positioned on the heat sink. Where more than one temperature sensor is positioned on the heat sink to measure a temperature thereof, and an average, e.g. mean, temperature may be computed from the plurality of temperature measurements.

The second data obtained at block 220 may comprise a second electric power value, e.g. $P_2$, and a second value of the associated parameter, e.g. $x_2$. The second data may comprise a tuple of the second electric power and associated parameter values $(P_2, x_2)$.

In examples, the method 200 involves determining a differential, e.g. $(x_2-x_1)$, between the first value of the associated parameter, $x_1$, and the second value of the associated parameter, $x_2$, where the first electric power value $P_1$ and the second electric power value $P_2$ correspond to each other. For example the first electric power value $P_1$ and the second electric power value $P_2$ may be substantially the same.

For example, the method may comprise obtaining: a first dataset of electric power values and corresponding associated parameter values, such as time or temperature values, recorded during the cooling operation; and a second dataset of electric power values and corresponding associated parameter values. Obtaining the first data comprising the first electric power value $P_1$, and corresponding associated parameter value, $x_1$, may therefore include selecting the first data from the first dataset based on the first electric power value $P_1$, e.g. selecting a data point in the first dataset having a particular electric power value, such as 0.8 $P_{max}$, where $P_{max}$ is the maximum amount of electrical power supplied to the cooling apparatus during the cooling operation. Similarly, obtaining the second data comprising the second electric power value $P_2$, and corresponding associated parameter value $x_2$, may therefore include selecting the second data from the second dataset based on the second electric power value $P_2$ corresponding to the first electric power value $P_1$, e.g. selecting a data point in the second dataset having the corresponding particular electric power value, such as 0.8 $P_{max}$, where $P_{max}$ is the maximum electrical power value in the second dataset. As an illustrative example, for a cooling apparatus comprising a cryocooler having a cryoplate as a heat sink, the first dataset may include first data comprising a first temperature value T1 of $-58°$ C. at 0.8 $P_{max}$, where the first temperature is an absolute measured temperature of the cryoplate e.g. measured by a thermocouple on the cryoplate. The first data set may be associated with an unknown given (first) cooling condition. In some cases, temperature data may comprise relative measured temperatures e.g. representing a difference between the measured cryoplate temperature and the ambient temperature. In this example, the second dataset may include second data comprising a second temperature value T2 of $-68.45\pm3.66°$ C. at 0.8 $P_{max}$, the second dataset being associated with a reference (second) cooling condition comprising the parameters: 100 ml sample volume, 10% w/v DMSO, 0.9% w/v NaCl (sodium chloride). Therefore, based on the first and second data, a differential $|T1-T2|=10.45°$ C. may be determined. The predetermined threshold may be based on the measurement uncertainty in this example, for example 3.66° C. The differential $|T1-T2|=10.45°$ C. being greater than the predetermined threshold 3.66° C. may thus indicate that the first and second cooling conditions are not substantially the same in this example.

In this illustrative example, a third dataset may include third data comprising a third temperature value T3 of $-59.1\pm1.45°$ C. at 0.8 $P_{max}$, the third dataset being associated with a third cooling condition comprising the parameters: 150 ml sample volume, 10% w/v DMSO, 0.9% w/v NaCl. Therefore, based on the first and second data, a differential $|T1-T2|=10.45°$ C. may be determined. The predetermined threshold, based on the measurement uncertainty, in this case may be 1.45° C. The differential $|T1-T3|=1.1°$ C. being less than the predetermined threshold 1.45° C. may thus indicate that the first and third cooling conditions are substantially the same in this example. Thus, the given cooling condition associated with the cooling operation on the biological sample may be interpreted to have substantially the same parameter values as the third cooling condition, for example 150 ml sample volume, 10% w/v DMSO, 0.9% w/v NaCl.

In other examples, the first and second electrical power values may be substantially the same such that the differential $(x_2-x_1)$ is computed between associated parameter values, $x_1$ and $x_2$, that correspond to the same electric power value $(P_1=P_2)$ in the respective first and second datasets.

In other examples, the method 200 involves determining a differential between the first electric power value $P_1$ and the second electric power value $P_2$, where the first value of the associated parameter $x_1$ and the second value of the associated parameter $x_2$ are substantially the same. For example, the method 200 may involve obtaining the first and second datasets described above, and selecting from the first dataset the first data based on the first value $x_1$ of the associated parameter, e.g. selecting a data point in the first dataset having a particular heat sink temperature value, such as 173 kelvin (K), during the cooling operation. Obtaining the second data may similarly involve selecting from the second dataset the second data based on the second value $x_2$ of the associated parameter corresponding to, e.g. being substantially the same as, the first associated value $x_1$, such as 173 K in this example.

In some examples, the first data comprises a first data series of electric power values and corresponding values of an associated parameter, for example as described above with reference to the first dataset.

The second data may similarly comprise a second data series of electric power values and corresponding values of the associated parameter, for example as described above with reference to the second dataset.

Figure 3:
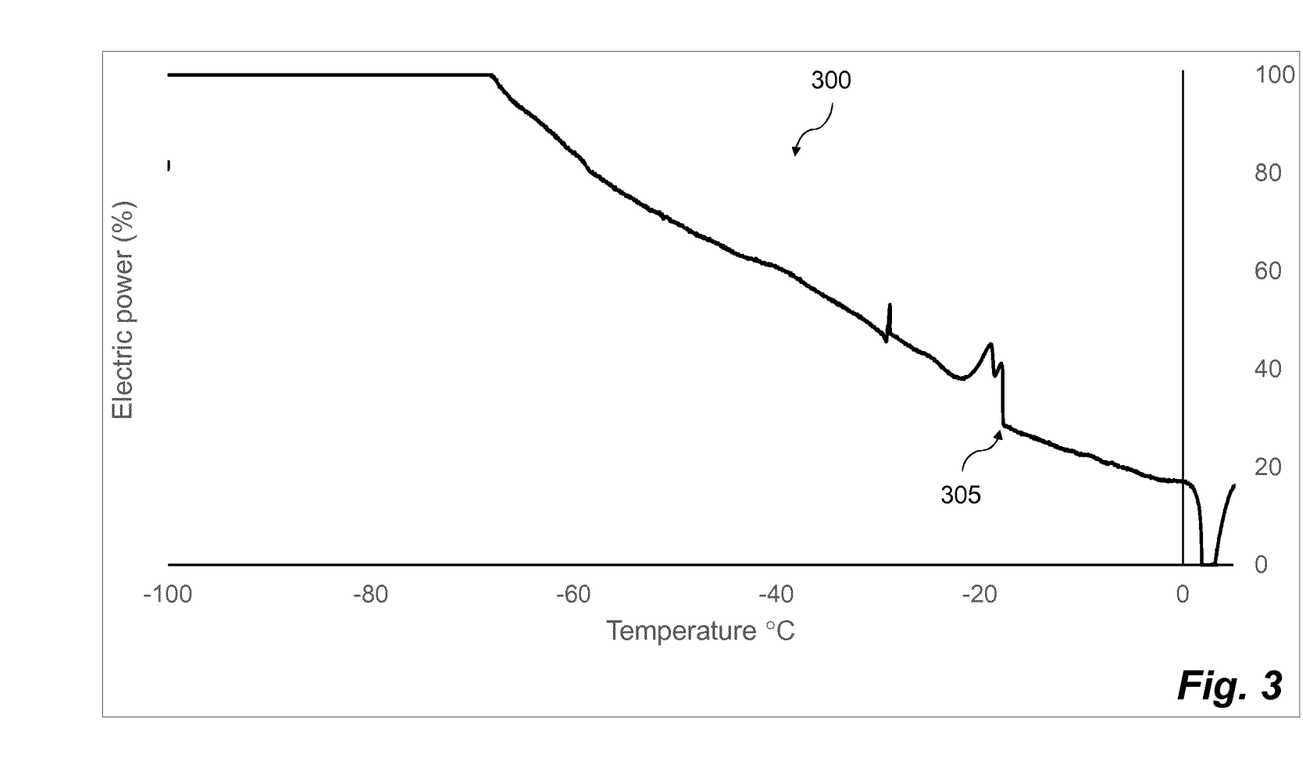
FIG. 3 shows a representation of an example data series of electric power values and corresponding temperature values.

FIG. 3 shows a representation of an example data series 300 comprising electric power values and corresponding temperature values. As described previously, where the example data series 300 corresponds to the first data series, the temperature values may be of a heat sink during the cooling operation, for example. Such a representation of the data series 300 may be termed a "power curve". The power curve shown in FIG. 3 is with respect to temperature, but other power curve examples may be with respect to time as the associated parameter, as previously described. The example data series 300 may be stored in a data structure, for example an array or table that associates each electric power value in the data series 300 with a corresponding temperature value. In the example data series represented by the power curve of FIG. 3, the electric power values are normalised as a percentage of the maximum power value $P_{max}$, which may be the maximum electrical power value in the data series 300. The electric power values in the first and/or second data series may similarly be normalised with respect to a particular power value, for example the maximum power value of the respective data series.

Determining, at block 230 of the method 200, whether the given cooling condition has a predetermined relationship with the reference cooling condition may be based on a statistical comparison between the first data series and the second data series.

For example, a first value of a statistical metric, such as an integral of the power curve, may be determined based on the first data series, and a second value of the statistical metric, e.g. power curve integral, may be determined based on the second data series. The first and second values of the statistical metric may be compared, with the determination of whether the given cooling condition has a predetermined relationship with the reference cooling condition being based on the comparison. For example, where the first and second values of the statistical metric are determined to be substantially the same within a predetermined tolerance, the given cooling condition may be determined to have the predetermined relationship with the reference cooling condition.

In some examples, the first and second data series, represented by respective power curves, may be analysed to determine respective associated parameter values at a spike in each of the first and second data series. For example, during cooling of a sample, at a point (in temperature or time) where ice nucleation begins to occur and ice crystals start forming in the sample, the sample temperature may rise sharply (for example with a greater than 50% change in the rate of temperature change) or "spike": with ice nucleation being an exothermic reaction, heat energy is released when it occurs, causing the sample temperature to increase. The sharp increase sample temperature can cause the heat sink temperature, e.g. a conductive plate or cold chamber in the cooling apparatus, to also increase sharply. Where the cooling system implements a temperature feedback system between the temperature sensors and power supply, via the cooling system control module, as described above with reference to FIG. 1, the increase in measured temperature can cause an increase in the amount of electric power supplied to the cooling apparatus as the cooling apparatus tries to reduce the temperature and match the cooling profile. The cooling profile may comprise cooling the sample at a substantially constant rate, for example. Thus, the cooling system control module may react when the temperature measurements spike during ice nucleation in the sample by increasing the amount of electric power supplied to the cooling apparatus in order to substantially maintain the constant cooling rate defined by the cooling profile. Such sudden increases in the amount of electric power supplied to the cooling apparatus may cause a spike 305 in the power curve representing the data series 300, as shown in FIG. 3.

The method 200 may therefore involve, in some cases, determining where such a spike occurs in a power curve, for example at what associated parameter (temperature, time) value the spike in electric power occurs. This may be done by determining a rate of change of the electric power with respect to the associated parameter, for example computing a derivative of the electric power with respect to the associated parameter in the respective data series. A predetermined threshold for the electric power derivative may be set such that a determined electric power derivative value above the predetermined threshold indicates the presence of a spike in the power curve. In such cases, determining at block 230 whether the given cooling condition has a predetermined relationship with the reference cooling condition based on the first data and the second data may involve comparing determined associated parameter values in the first and second data series at which a spike in electric power occurs.

In certain examples, a plurality of spikes in the electric power curve may be determined in a given data series. In such examples, determining at block 230 whether the given cooling condition has a predetermined relationship with the reference cooling condition based on the first data and the second data may involve determining one or more "outlier" spikes. For example, clusters of electric power spikes may correspond with each other in the first and second data series, but the first data series may comprise an electric power spike that is determined to be at a given associated parameter value that is more than a predetermined threshold away from the associated parameter value of the nearest power spike in the second data series. In this case, it may be determined that the given cooling condition has the predetermined relationship, for example is substantially different to, the reference cooling condition.

In examples, the method 200 involves determining a similarity metric based on the first data and the second data. For example, where the first and second data are one-dimensional (1D), e.g. comprise one or more values of a single parameter, such as electric power as previously described, the similarity metric may be the differential between a first electric power value $P_1$ of the first data, and a second electric power value $P_2$ of the second data, e.g. $(P_1-P_2)$ or $|P_2-P_1|$.

In other examples, as described, the first and second data are two-dimensional (2D) and comprise one or more respective values of two parameters, such as electric power and an associated parameter, e.g. time or temperature. In such examples, the similarity metric may correspond to a differential, e.g. $(x_2-x_1)$, between the first value of the associated parameter, $x_1$, and the second value of the associated parameter, $x_2$, where the first electric power value $P_1$ and the second electric power value $P_2$ correspond to each other, as described in examples above. Alternatively, the similarity metric may correspond to a differential, e.g. $(P_2-P_1)$, between the first electric power value $P_1$ and the second electric power value $P_2$, where the first value of the associated parameter $x_1$ and the second value of the associated parameter $x_2$ are substantially the same, as also described in examples above.

In further examples, the first and second data may be 2D and comprise: a first data series of electric power values and corresponding values of an associated parameter; and a second data series of electric power values and corresponding values of the associated parameter; respectively, and as previously described. In these examples, the similarity metric may be determined based on a statistical comparison between the first data series and the second data series. For example, as described above, a first value of a statistical metric may be determined based on the first data series, and a second value of the statistical metric, may be determined based on the second data series. The similarity metric in this example may correspond to a differential between the first and second values of the statistical metric.

Determining, at block 230 of the method 200, whether the given cooling condition has the predetermined relationship with the reference cooling condition may be based on a comparison of the similarity metric to a predetermined threshold. For example, it may be determined that the given cooling condition has the predetermined relationship with the reference cooling condition if the similarity metric is: less than; less than or equal to; equal to; greater than; or greater than or equal to; the predetermined threshold. The predetermined relationship between the given cooling condition and the reference cooling condition may be that they are: substantially the same, e.g. similar; or substantially different, e.g. dissimilar.

In some examples of the method 200, the control signal is a first control signal and the predetermined relationship is a first predetermined relationship. The method 200 in such examples may further involve determining, based on the first data and the second data, whether the given cooling condition has a second predetermined relationship with the reference cooling condition.

Such a "second determination" of whether the given cooling condition has a second predetermined relationship with the reference cooling condition may be in accordance with any of the previously described examples of a "first determination" of whether the given cooling condition has a predetermined relationship with the reference cooling condition. In examples, the first and second determinations may result from a single determination: for example, where a differential or a similarity metric is determined based on the first and second data, and the differential or similarity metric is compared to a predetermined threshold; a first outcome of the comparison (e.g. that the differential or similarity metric is greater than the predetermined threshold) may indicate that the given cooling condition has the first predetermined relationship with the reference cooling condition, whereas a second outcome (e.g. that the differential or similarity metric is less than or equal to the predetermined threshold) may indicate that the given cooling condition has the second predetermined relationship with the reference cooling condition. The first and second outcomes of such a comparison may be complementary, as in the described example.

In other examples, the first determination and second determination may be separate determinations performed as part of the method 200. For example, the first determination may involve a first predetermined threshold as the predetermined threshold in the examples described, whereas the second determination may involve a second predetermined threshold as the predetermined threshold, in examples.

In response to determining that the given cooling condition has the second predetermined relationship with the reference cooling condition, the method 200 may include outputting a second control signal. Thus, the second control signal may be generated and output in response to a determination, by the determining, that the given cooling condition has the second predetermined relationship with the reference cooling condition. Similarly to the first control signal examples described above, in certain cases, the second control signal may cause interruption of the cooling operation and, additionally or alternatively, may cause an output, indicative of the predetermined second relationship between the given cooling condition and the reference cooling condition, via a user interface. The user interface may be the same user interface via which the first control signal is to cause an output in certain examples. For example, the first control signal, output in response to determining that the given cooling condition has the first predetermined relationship with the reference cooling condition may cause a first output indicative of the first predetermined relationship via a first user interface. The second control signal, output in response to determining that the given cooling condition has the second predetermined relationship with the reference cooling condition may cause a second output indicative of the second predetermined relationship via a second user interface.

For example, the first predetermined relationship between the given cooling condition and the reference cooling condition may be that they are substantially the same, e.g. similar, and the second predetermined relationship may be that they are substantially different, e.g. dissimilar. Thus, the first control signal may indicate that the cooling conditions are substantially the same via the first user interface, e.g. causing output of a green LED, the display of a first image on a display screen, or storage and/or transmission of text data in a report or data log, indicating that the cooling conditions or parameters thereof, e.g. the biological sample volume and the reference sample volume, are substantially the same. The second control signal, on the other hand, may indicate that the cooling conditions are substantially different via the second user interface, e.g. causing output of a red LED, the display of a second image on a display screen, or storage and/or transmission of text data in a report or data log, indicating that the cooling conditions or parameters thereof, e.g. the biological sample volume and the reference sample volume, are substantially different.

In some examples, the first and second user interfaces are the same interface, or in other words, the first and second control signals are to cause respective outputs via the same, e.g. the first, user interface. For example, the user interface may be capable of displaying a range of information, and the first and second control signals may determine what particular information is displayed by the user interface, e.g. the colour of the LED, the text or image displayed, etc.

In any of the method 200 examples described above, the cooling operation, e.g. as implemented by the cooling apparatus as part of the cooling system, may cool the biological sample at a substantially constant rate. For example, the cooling apparatus may cool the biological sample according to a cooling profile (e.g. representing a change in cooling rate over time or temperature, and/or a change in temperature over time, during the cooling operation). For at least a part of the cooling profile, a substantially (for example within accepting measuring tolerances) constant cooling rate may be implemented. For example, the substantially constant cooling rate may be substantially (for example within accepting measuring tolerances) 1 degree Celsius per minute in examples, such that the cooling apparatus is to objectively cool the biological sample by 1 degree Celsius per minute of the cooling operation for the corresponding at least part of the cooling profile.

As described above, different objective cooling rates, e.g. rates of temperature change with respect to time, may be set at different stages of the cooling profile. In some examples, a constant objective cooling rate may be set in the cooling profile FIG. 4 shows a non-transitory computer-readable storage medium 420 comprising a set of computer-readable instructions 425 stored thereon. The computer-readable storage medium 420 may be communicatively coupled to the at least one processor 450, as shown. The set of computer-readable instructions 425 may be executed by the at least one processor 450 to cause the at least one processor 450 to perform a method according to any of the examples described herein.

The at least one processor 450 may include a microprocessor, microcontroller, processor module or subsystem, programmable integrated circuit, programmable gate array, or another control or computing device. The computer-readable storage medium 420 may be implemented as one or multiple computer-readable storage media. The computer-readable storage medium 420 can include different forms of memory, including semiconductor memory devices such as dynamic or static random access memory modules (DRAMs or SRAMs), erasable and programmable read-only memory modules (EPROMs), electrically erasable and programmable read-only memory modules (EEPROMs) and flash memory; magnetic disks such as fixed, floppy and removable disks; other magnetic media including tape; optical media such as compact disks (CDs) or digital video disks (DVDs); or other types of storage devices. The computer-readable instructions 425 can be stored on one computer-readable storage medium, or alternatively, can be stored on multiple computer-readable storage media. The computer-readable storage medium or media 420 can be located either in a cooling system or located at a remote site from which computer-readable instructions 425 can be downloaded over a data network for execution by the at least one processor 450.

The at least one processor 450 and the computer-readable storage medium 420 may be components of a cooling system, for example. The cooling system may comprise a cooling system similar to the cooling system 100 described with reference to FIG. 1.

Figure 5:
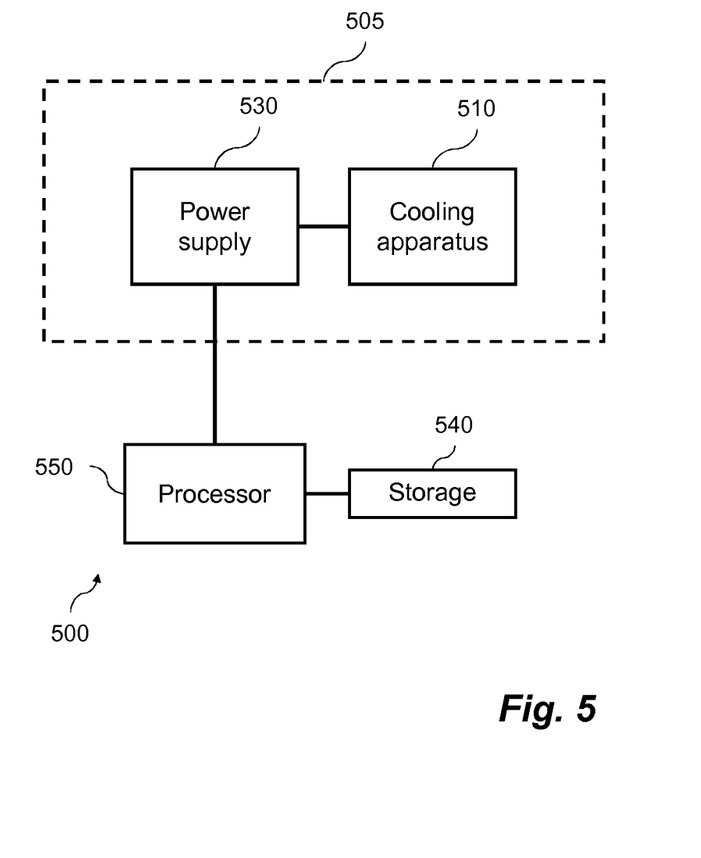
FIG. 5 shows a schematic system diagram of an example system comprising hardware to implement described method examples.

FIG. 5 shows a system 500 that includes a processor 550 (which may comprise one or more processors) and computer readable storage 540. The processor 550 may be configured, for example the processor is operable, to perform any of the method examples described herein.

Figure 4:
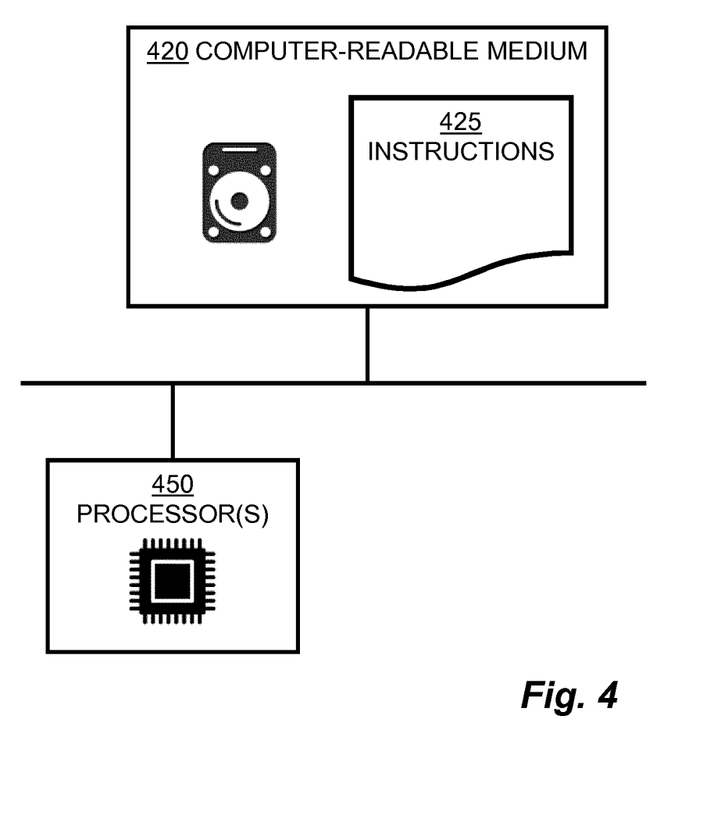
FIG. 4 shows a schematic diagram of example hardware architecture to perform described method examples.

In examples, the processor 550 corresponds with the at least one processor 450 described in examples with reference to FIG. 4. For example the processor may be communicatively coupled to a computer-storage medium, which may be separate to or a part of the computer readable storage 540, and which may store the set of computer-readable instructions that, when executed by the processor 550, causes the processor 550 to perform the method.

The processor 550 is configured to obtain the second data, associated with the reference cooling condition, from the computer-readable storage 540. For example, second data associated with a particular reference cooling condition may be selected, e.g. by a user, as reference data for the cooling operation. For example, the biological sample to be cooled by the cooling apparatus may be considered by the user to comprise 150 ml of fluid with 10% concentration DMSO and 0.9% concentration NaCl. The user may therefore select the second data associated with the reference cooling condition that has corresponding sample volume and sample composition parameter values (150 ml volume, 10% DMSO, 0.9% NaCl in this example case). In other examples, multiple sets of second data, associated with multiple reference conditions, may be selected or pre-programmed to be obtained by the processor 550 from the computer readable storage 540. In such examples, the method according to any of the examples described herein may be performed with the first data indicative of electric power supplied to the cooling apparatus during the cooling operation, and with each of multiple second data respectively associated with different reference cooling conditions. In this way, the method performed by the processor 550 may determine that the given cooling condition has the predetermined relationship with one or more of the different reference cooling conditions. In some cases, e.g. where the predetermined relationship comprises the given cooling condition and the reference cooling condition being substantially the same, the method performed by the processor 550 may determine which reference cooling condition, of the different reference cooling conditions comprised in the second data, is most similar to the given cooling condition. Thus, the control signal output by or via the processor 550 may cause an indication of the reference cooling condition that the given cooling condition is most similar to.

In some examples, the system 500 includes a programmable power supply 530. The programmable power supply 530 is configured to supply electric power to the cooling apparatus 510 during the cooling operation. The power supply 530 and the cooling apparatus 510 may correspond to the power supply 130 and the cooling apparatus 110 described with reference to FIG. 1, respectively. For example the power supply 530 and the cooling apparatus 510 may be part of a cooling system 505 corresponding to the cooling system 100 of FIG. 1. The programmable power supply 530 may modulate the electric power supplied to the cooling apparatus 110, for example by interaction with a control module corresponding to the control module 140 described with reference to FIG. 1. Hence, the power supply may be considered to be programmable as it can be programmed, under control of the control module, to output a desired electric power at a given time during the cooling operation.

The programmable power supply 530 may also transmit the first data indicative of the electric power supplied to the cooling apparatus 110. In examples, the programmable power supply 530 may transmit the first data directly to the processor 550, which receives and processes the first data as part of the implemented method. In some cases, the power supply 530 may transmit the first data to the processor 550 via other components, for example the control module of the cooling system 105, if present. The first data for transmission may be generated by the programmable power supply. For example, the programmable power supply may determine a value of electric power presently being supplied to the cooling apparatus, generate the first data on this basis, such that the first data is indicative of the value of the electric power being supplied to the cooling apparatus at a given point in time, for the first data then to be transmitted as described above.

The processor 550 may be connected, directly or indirectly, to the power supply 550 and the computer-readable storage 540 over a data network. In such examples, the processor 550 may receive the first and second data via the data network. For example, the first and second data may be transmitted to a server connected to the data network, and the processor may download the first and second data from the server when obtaining the first data and the second data as part of the implemented method.

In certain examples, the system 500 comprises the cooling apparatus 510, which may be a cryocooler, for example, as previously described. The cooling apparatus 510 and the power supply 530 may be part of the cooling system 505, which may be remote from the processor 550 and/or the storage 540. For example, the cooling system 505 may be situated at a first location and communicatively coupled, e.g. via the data network, to the processor 550 and/or the storage 540, which may be situated at a second and a third location, respectively.

In some other examples, the cooling system 505 includes the processor 550 and/or the storage 540 as a component thereof. For example, the processor 550, which is configured to perform the method according to any of the examples described herein, may be an internal component of the cooling system 505. Similarly, the computer-readable storage 540 may additionally or alternatively be an internal component of the cooling system 505. Internal components of the cooling system 505 may be communicatively coupled physically, whereas external components of the cooling system 505 may be communicatively coupled wirelessly, e.g. over the data network, in certain examples.

In certain examples, the cooling operation on the biological sample may be implemented by a plurality of cooling apparatuses 510. For example, the cooling system 505 may include multiple cooling apparatuses 510, e.g. multiple cryocoolers. The processor 550 may, in such examples, obtain first data indicative of electric power supplied to each of the cooling apparatuses 510, and/or indicative of electric power supplied to all of the cooling apparatuses 510. The power supply 530 may be configured to supply and modulate electric power to each of the cooling apparatuses individually during the cooling operation. For example, a temperature sensor such as a thermocouple may be positioned on the heat sink of each cooling apparatus 510, and the electric power supplied to each apparatus 510 may be modulated by the power supply 530 based on the measured temperature of the respective heat sink and the implemented cooling profile. In certain cases, the heat sink temperature data and the electric power data may be averaged, e.g. a mean calculated, over the number of cooling apparatuses 510, respectively. In other cases, the heat sink temperature data may be averaged over the number of cooling apparatuses 510, but the electric power data may comprise the total amount of electric power supplied to all of the cooling apparatuses 510 at each given data point, e.g. in time or temperature intervals.

In some cases, the plurality of cooling apparatuses 510 may share a common heat sink, for example a heat conductive plate or a cryochamber, for directly cooling the sample. In such cases, the heat sink temperature data may be obtained via one or more temperature sensors positioned on or in the heat sink, and in cases where there is a plurality of temperature sensors, the temperature data may be averaged. Each of the plurality of cooling apparatuses 510 may have a different cooling capacity in some examples.

The above examples are to be understood as illustrative examples. Further examples are envisaged, for example a computer program product, such as computer software, comprising instructions which, when the program is executed by a computer, cause the computer to perform a method according to any of the method examples described herein.

Further examples are also envisaged where the first data is indicative of electric power supplied to a cooling apparatus during a cooling operation on a calibration sample, or no sample, and the reference cooling condition is associated with a cooling operation on the calibration sample or no sample, respectively, performed by a reference cooling apparatus (which may be hypothetical, e.g. the second data may be generated or measured data) such that the methods may be used to assess a condition of the cooling apparatus relative to the reference cooling apparatus. Such methods may therefore be implemented as a cooling apparatus diagnostic method.

In such examples, the diagnostic method may include determining a diagnostic metric value based on the first data and the second data, e.g. in a similar way to determining the similarity metric in certain described examples. Determining whether the cooling apparatus is in a predetermined condition, for example a good or a bad condition, relative to the reference cooling apparatus may be based on a comparison between the diagnostic metric value and a predetermined threshold value.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

The invention claimed is:

1. A computer-implemented method comprising:
    obtaining first data indicative of electric power supplied to a cooling apparatus during a cooling operation on a biological sample, the cooling operation having a given cooling condition;
    obtaining second data associated with a reference cooling condition;
    determining, based on the first data and the second data, whether the given cooling condition has a predetermined relationship with the reference cooling condition; and in response to a determination, by the determining, that the given cooling condition has the predetermined relationship with the reference cooling condition, outputting a control signal.

2. The computer-implemented method according to claim 1, comprising:
determining a similarity metric based on the first data and the second data,
wherein the determining whether the given cooling condition has the predetermined relationship with the reference cooling condition is based on a comparison of the similarity metric to a predetermined threshold.

3. The computer-implemented method according to claim 1, wherein the control signal is to cause interruption of the cooling operation.

4. The computer-implemented method according to claim 1, wherein the control signal is to cause an output, indicative of the predetermined relationship between the given cooling condition and the reference cooling condition, via a user interface.

5. The computer-implemented method according to claim 1, wherein the control signal is a first control signal and the predetermined relationship is a first predetermined relationship, the method comprising:
based on the first data and the second data, determining whether the given cooling condition has a second predetermined relationship with the reference cooling condition; and
in response to a determination, by the determining, that the given cooling condition has the second predetermined relationship with the reference cooling condition, outputting a second control signal.

6. The computer-implemented method according to claim 1, wherein:
the first data comprises a first electric power value and a first value of an associated parameter; and
the second data comprises a second electric power value and a second value of the associated parameter;
wherein the associated parameter corresponds to:
time; or
temperature of a heat sink of the cooling apparatus.

7. The computer-implemented method according to claim 6, comprising determining a differential between the first value of the associated parameter and the second value of the associated parameter, wherein the first electric power value and the second electric power value correspond to each other.

8. The computer-implemented method according to claim 6, comprising determining a differential between the first electric power value and the second electric power value, wherein the first value of the associated parameter and the second value of the associated parameter are within a predetermined tolerance.

9. The computer-implemented method according to claim 1, wherein:
the first data comprises a first data series of electric power values and corresponding values of an associated parameter; and
the second data comprises a second data series of electric power values and corresponding values of the associated parameter;
wherein the associated parameter corresponds to:
time; or
temperature of a heat sink of the cooling apparatus.

10. The computer-implemented method according to claim 9, wherein determining whether the given cooling condition has a predetermined relationship with the reference cooling condition is based on a statistical comparison between the first data series and the second data series.

11. The computer-implemented method according to claim 1, wherein:
the first data comprises a first electric power value corresponding to a peak value of electric power supplied to the cooling apparatus during the cooling operation;
the second data comprises a second electric power value; and
determining whether the given cooling condition has a predetermined relationship with the reference cooling condition comprises determining a differential between the first and second electric power values.

12. The computer-implemented method according to claim 1, wherein the given cooling condition and the reference cooling condition each comprises a respective value for at least one of: a sample volume; a sample composition parameter; a number of samples; a sample container size; a sample container; a cooling apparatus; a cooling rate; a cooling profile; and an initial temperature of a sample, or a heat sink of the cooling apparatus.

13. The computer-implemented method according to claim 1, wherein the cooling operation cools the biological sample at a constant rate, within accepting measuring tolerances.

14. The computer-implemented method according to claim 13, wherein the constant rate is 1 degree Celsius per minute.

15. A non-transitory computer-readable storage medium comprising a set of computer-readable instructions stored thereon which, when executed by at least one processor, cause the at least one processor to perform a method according to claim 1.

16. A system comprising a processor configured to perform a method according to claim 1, wherein the processor is configured to obtain the second data from computer-readable storage.

17. The system according to claim 16, comprising a programmable power supply configured to:
supply electric power to the cooling apparatus during the cooling operation;
modulate the electric power supplied to the cooling apparatus,
transmit the first data.

18. The system according to claim 16, comprising the cooling apparatus configured to perform the cooling operation.

19. The system according to claim 18, wherein the cooling apparatus comprises a cryocooler.

* * * * *